US006356260B1

(12) United States Patent
Montalbo

(10) Patent No.: US 6,356,260 B1
(45) Date of Patent: Mar. 12, 2002

(54) METHOD FOR REDUCING POWER AND ELECTROMAGNETIC INTERFERENCE IN CONVEYING VIDEO DATA

(75) Inventor: Joseph Domenick Montalbo, Fremont, CA (US)

(73) Assignee: National Semiconductor Corporation, Santa Clara, CA (US)

(*) Notice: Subject to any disclaimer, the term of this patent is extended or adjusted under 35 U.S.C. 154(b) by 0 days.

(21) Appl. No.: 09/058,270

(22) Filed: Apr. 10, 1998

(51) Int. Cl.[7] .................................................. H04N 5/22

(52) U.S. Cl. ........................... 345/204; 345/97; 345/98; 345/100

(58) Field of Search .............................. 345/97, 98, 99, 345/100, 199, 204, 211, 516

(56) References Cited

U.S. PATENT DOCUMENTS

| | | | | |
|---|---|---|---|---|
| 4,112,463 A | * 9/1978 | Kamin | ........................ | 345/154 |
| 5,034,964 A | * 7/1991 | Khan et al. | .................... | 375/25 |
| 5,602,655 A | * 2/1997 | Arakawa et al. | ............ | 358/501 |
| 5,646,646 A | * 7/1997 | Inoue et al. | ................ | 345/123 |
| 5,748,167 A | * 5/1998 | Watanabe et al. | ............. | 345/98 |
| 5,844,536 A | * 12/1998 | Okada et al. | ................. | 345/97 |
| 5,874,935 A | * 2/1999 | Nishi et al. | ................... | 345/98 |
| 5,974,464 A | * 10/1999 | Shin et al. | .................. | 709/231 |
| 5,956,011 A | * 9/2000 | Koyama et al. | .............. | 345/98 |

FOREIGN PATENT DOCUMENTS

| | | | |
|---|---|---|---|
| EP | 0 533 472 | 3/1993 | ............ H04N/3/14 |
| EP | 0 581 594 | 2/1994 | ............ G09G/3/36 |
| EP | 0 740 285 | 10/1996 | ............ G09G/3/36 |
| JP | 10020837 | 1/1998 | |

* cited by examiner

*Primary Examiner*—Bipin Shalwala
*Assistant Examiner*—Vincent E. Kovalick
(74) *Attorney, Agent, or Firm*—Skjerven Morrill MacPherson LLP; Carmen C. Cook

(57) ABSTRACT

A control circuitry for conveying video data in a flat panel display transmits video data using reduced swing differential signals that are time-multiplexed on a data bus. Data transmission schemes are provided to reduce data transitions on the data bus. A repeat last pixel scheme is used whenever the pixel data repeat horizontally on a display. A repeat last line pixel scheme is used whenever the pixel data repeat vertically on a display. A repeat last different pixel scheme is used whenever video data comprises mainly of monochrome information. In the alternate, a dynamic color pallet is used to store a few most frequently used pixel colors. When the current pixel color matches one of the colors stored, a pixel color address is transmitted instead of the pixel data itself. The use of reduced swing differential signaling on a time-multiplexed data bus together with one or more of the data transmission schemes achieves significant reduction in power consumption and electromagnetic interference generation.

30 Claims, 8 Drawing Sheets

TOTAL # OF WIRES =
1 (CLOCK) + 18 (PIXEL DATA) = 19

TOTAL # OF WIRES =
1 (CLOCK) + (2x18) (PIXEL DATA) = 37

TOTAL # OF WIRES =
2 (DIFFERENTIAL CLOCK) + 18 (DIFFERENTIAL PIXEL DATA) = 20

METHOD FOR REDUCING POWER AND ELECTROMAGNETIC INTERFERENCE IN CONVEYING VIDEO DATA

BACKGROUND OF THE INVENTION

1. Field of the Invention

The invention generally relates to a method and an apparatus for conveying video data; and in particular, the present invention relates to a method and an apparatus for conveying video data which reduce power consumption and electromagnetic interference.

2. Background of the Invention

In a liquid crystal flat panel display, digital video data supplied by a host computer are converted into analog voltages which drive a display to produce the desired greyscale or color images. FIG. 1 illustrates a block diagram of an exemplary flat panel display system.

In FIG. 1, a flat panel display system 10 includes a liquid crystal display (LCD) panel 100 which is, for example, a 640 pixels wide by 480 lines high VGA color TFT panel. In this illustration, LCD panel 100 has 640 columns and 480 lines (or rows) of pixels. Images are displayed on LCD panel 100 by activating each row of pixels sequentially while applying the appropriate voltages to the pixels of each column. The columns of LCD panel 100 are driven by display drivers, also known as column drivers. In a flat panel display system where the LCD panel includes only a small number of columns, a single display driver may be used to drive all the columns of the LCD panel. However, in display system 10 of FIG. 1, a bank of display drivers 120A to 120E are needed to support LCD panel 100, each display driver driving a portion of a line of pixels on LCD panel 100. In this example, display system 10 uses a single-bank configuration where display drivers 120A to 120E are serially arranged on one side of LCD panel 100. Typically, display drivers 120A to 120E are mounted directly on the glass of LCD panel 100. In this illustration, each of the display drivers 120A to 120E is capable of providing 240 analog output voltages to LCD panel 100, representing 80 channels for each of Red, Green and Blue (RGB) subpixel output signals. Display drivers 120A to 120E drive different voltage levels onto LCD panel 100 to vary the brightness of each pixel. The rows of LCD panel 100 are driven by gate drivers 150A to 150E. Gate drivers 150A to 150E are activated sequentially to turn on one row of pixels at a time, allowing analog voltages driven onto the columns to be applied to each row of pixels in series.

Display drivers 120A to 120E receive video data, also called pixel data, from a timing controller 130 on data bus 140. Typically, timing controller 130 is not mounted on the glass of LCD panel 100. Timing controller 130 receives digital display data, or video data, from a host computer (not shown) on data lines 110. Timing controller 130 "picks" the display data out one pixel at a time and synchronizes the pixel data with a video clock signal provided on line 112. The pixel data, along with the clock signal are then delivered to display drivers 120A to 120E on data bus 140. Specifically, timing controller 130 delivers the pixel data on data lines 142 and the clock signal on clock line 144.

FIG. 2 is a block diagram of a display driver 200, representative of any of display drivers 120A to 120E in FIG. 1. In FIG. 2, display driver 200 is only one of a bank of display drivers, each operating in the same manner to provide one portion of a line of pixel data to LCD panel 100. Referring to FIG. 2, during operation, timing controller 130 delivers pixel data to display driver 200 on data lines 220 and a clock signal on clock line 222. Shift register 202, which performs a control function, loads the input pixel data one pixel at a time from data register 204 into the respective latches in data latches 206. In this illustration, data latches 206 comprises 240×6 latches for storing 240 pixels of 6-bit RGB data.

Timing controller 130 loads pixel data into display driver 200 until all 240 latches in data latches 206 are filled. In a display system comprising multiple display drivers, such as display system 10 in FIG. 1, timing controller 130 loads pixel data into display drivers 120A to 120E until an entire row of pixel data has been loaded. Then, display driver 200 loads the pixel data stored in data latches 206 into digital-to-analog converter (DAC) latches 208. Thus in reference to display system 10 in FIG. 1, after an entire row of pixel data has been loaded into data latches of each of display drivers 120A to 120E, display drivers 120A to 120E then simultaneously load the row of pixel data into their respective DAC latches.

DAC latches 208 converts the digital signals to analog voltages which are then provided to a DAC output circuit 212. DAC output circuit 212 drives the analog voltages onto the respective columns of LCD panel 100.

While a new row of data is being loaded pixel by pixel into data latches 206, the previous row of pixel data in DAC latches 208 is not overwritten until a full row of new pixel data has been loaded into data latches 206.

In a high resolution flat panel display, such as flat panel display system 10, the data bus, such as data bus 140 in FIG. 1, dissipates a significant amount of power and also generates a large amount of electromagnetic interference (EMI). Power dissipation is high because most existing displays use TTL voltage levels (3.3 volts CMOS levels) to transmit pixel data. In addition, high data rates and sharp transition edges generate significant EMI.

Efforts have been made to reduce the power dissipation and EMI generation in a flat panel display system. One commonly employed approach involves splitting the pixel data into two buses, each operating at half the data rate. FIGS. 3*a* and 3*b* illustrate respectively the data bus configuration of a conventional display system and of another prior art display system employing a dual bus configuration for reducing EMI. Referring to FIG. 3*a*, flat panel display system 300*a* has an 18-bit wide pixel data, comprising 1 bits for each of Red, Green, and Blue subpixel data. The pixel data is transmitted together with a 1-bit wide pixel clock. Thus, in a conventional flat panel display system such as display system 300*a*, 19 wires are required to transmit the pixel data and the pixel clock signal. In FIG. 3*a*, timing controller 330*a* transmits the 18-bit pixel data on data bus 304*a* and the 1-bit pixel clock on clock line 302*a* to display drivers 320*aa* to 320*ae*.

Referring to FIG. 3*b*, display system 300*b* uses a dual bus configuration to transmit video data. Timing controller 330*b* splits up the 18-bit pixel data and transmits pixel data alternately over two 18-bit wide data buses 304*b* and 305*b*. Data buses 304*b* and 305*b* are connected alternately to display drivers 320*ba* to 320*bf*. Display system 300*b* has several disadvantages. First, although slower transition edges are obtained which can be effective in reducing EMI, the introduction of an additional data bus (data bus 305*b*) actually increases power dissipation and reduces noise immunity. Another disadvantage of display system 300*b* is that the number of data wires for transmitting pixel data is substantially increased. Specifically, the second data bus 305*b* adds 18 data wires to display system 300*b*. Thus; a total of 37 wires are now required to transmit the pixel data and the pixel clock, as opposed to the 19 wires required in the conventional display system in FIG. 3*a*. The additional data wires consume valuable space on the PC board of the flat panel display. As flat panel displays become thinner, PC board space becomes a premium and introducing large number of additional data lines becomes unfeasible.

Therefore, it is desirable to reduce power dissipation and EMI generation in a flat panel display system without significantly increasing the number of data wires and without compromising noise immunity.

SUMMARY OF THE INVENTION

According to the present invention, reduced swing differential signals are used in combination with a multiplexed data bus to convey video data in a video display system so as to reduce power consumption and electromagnetic interference.

In one embodiment, a control circuitry for a video display system comprises (a) a transmitting circuit for transmitting video data; (b) a receiving circuit for receiving the video data and converting the video data into analog voltages for display on a flat panel display; and (c) a data bus capable of transmitting video data in the form of reduced swing differential signals where the video data are time multiplexed on the data bus.

According to another aspect of the present invention, data transmission schemes are provided to work in conjunction with a multiplexed video data bus to reduce the number of data transitions on the data bus. Whether applied to a multiplexed video data bus or to a conventional video display system, the data transmission schemes of the present invention achieve a significant reduction in power consumption and electromagnetic interference generation while conveying video data. The data transmission schemes of the present invention exploit the horizontal and vertical repeatability of video data.

In one embodiment, a Repeat Last Pixel scheme is provided where the transmitting circuit transmits a Repeat Last Pixel signal whenever the current pixel repeats horizontally. Thus, when the current pixel data are the same as the previous pixel data, no pixel data is sent over the data bus for the current pixel. Instead, only the Repeat Last Pixel signal is transmitted. The receiving circuit, upon receipt of the Repeat Last Pixel signal, retrieves the pixel data from its local storage for display onto the flat panel display.

In another embodiment, a "Repeat Last Line Pixel" scheme is provided where the transmitting circuit transmits a Repeat Last Line Pixel signal whenever the current pixel repeats vertically. When the current pixel data are the same as the pixel data of the same column on the previous line, no pixel data is transmitted for the current pixel. Instead, the Repeat Last Line Pixel signal is transmitted. The receiving circuit, upon receipt of the Repeat Last Line Pixel signal, retrieves the pixel data from its local storage for display onto the flat panel display.

In another embodiment of the present invention, a "Repeat Last Different" scheme is used when video data are predominated by two or a few pixel colors. The transmitting circuit stores the last different pixel color whenever the pixel color changes. Then, in transmitting a subsequent pixel, the subsequent pixel data are compared with the stored last different pixel color. If a match is found, a Repeat Last Different Pixel signal is transmitted. The receiving circuit accordingly retrieves from its local storage the pixel data for the last different pixel color and drives the corresponding voltages onto the display. The Repeat Last Different Pixel scheme is particularly effective when the video data comprises mainly of monochrome information.

In yet another embodiment of the present invention, a dynamic color pallet is used to store a few most frequently used pixel colors. The transmitting circuit transmits a pixel color address to the receiving circuit when the current pixel color matches one of the pixel colors stored in the color pallet. The receiving circuit uses the pixel color address to retrieve the corresponding pixel color from its local storage for display onto the flat panel display system. As long as fewer data bits are required to transmit the pixel color address as compared to the pixel color data itself, the use of the dynamic color pallet reduces power dissipation and EMI.

The present invention is better understood upon consideration of the detailed description below and the accompanying drawings.

BRIEF DESCRIPTION OF THE DRAWINGS

In the present disclosure, like objects which appear in more than one figure are provided with like reference numerals.

DETAILED DESCRIPTION OF THE PREFERRED EMBODIMENTS

According to the principle of the present invention, a flat panel display system uses reduced swing differential signaling (RSDS) to transmit pixel data. In one embodiment of the present invention, a voltage swing of 200 mV or below is used, representing a significant reduction from the 3.3 volts swing used in the prior art. The reduced voltage swing significantly lessens EMI generation. Furthermore, noise immunity is increased through the use of differential signaling.

In accordance with the present invention, reduced voltage differential signaling is applied to transmit pixel data between a transmitting end and a receiving end of a data bus in a flat panel display system. In one embodiment, reduced swing differential signaling is used to transmit pixel data over the data bus from a timing controller to a display driver or to a bank of display drivers when multiple display drivers are used. In other embodiments, reduced swing differential signaling can be used to transmit pixel data from the host possessor to the timing controller and then to the display drivers.

Figures 3A, 3B, 3C:
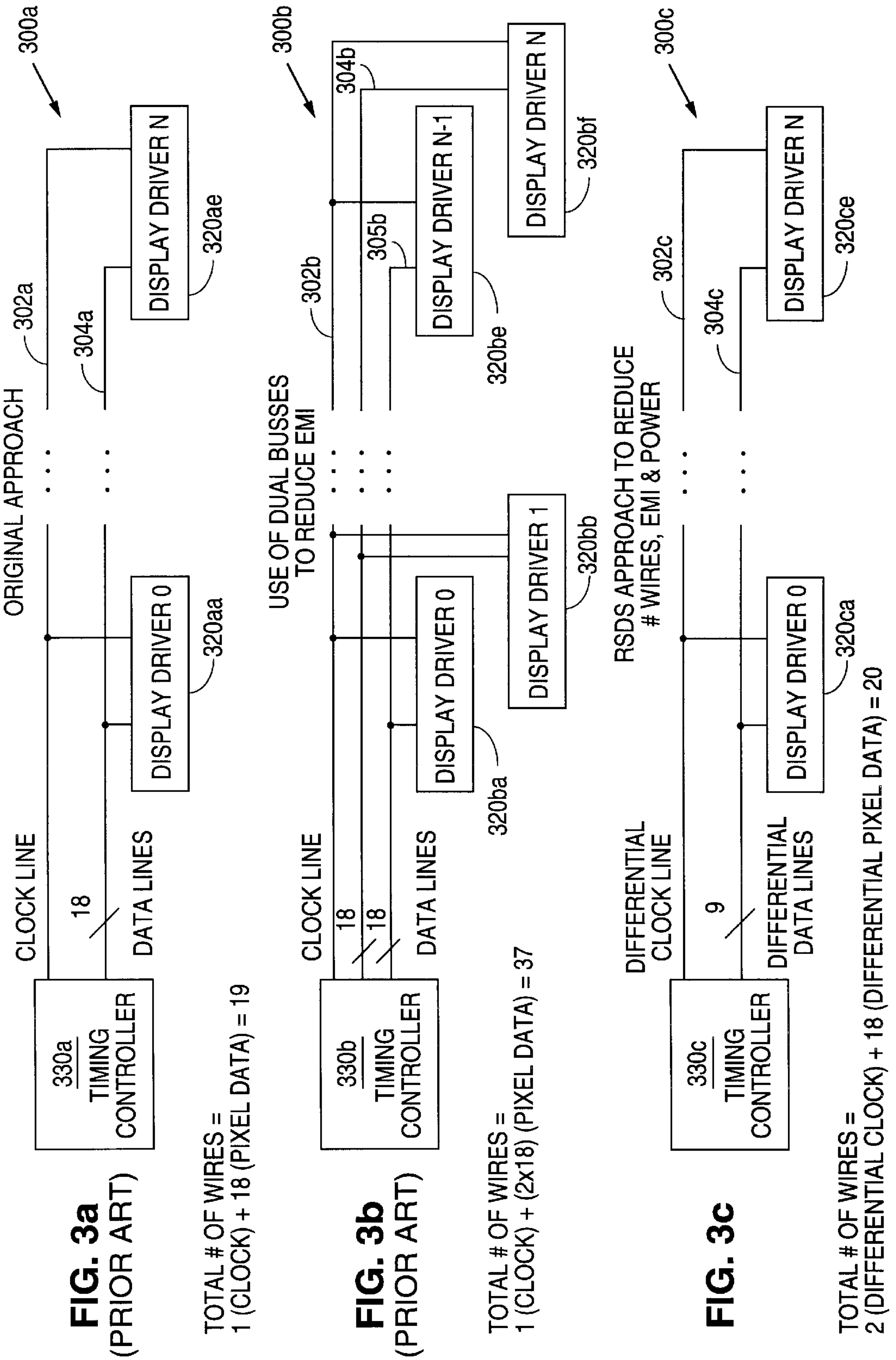
FIG. 3a (PRIOR ART)
FIG. 3b (PRIOR ART)
FIG. 3*a* illustrates the bus configuration of a conventional flat panel display system.
FIG. 3*b* illustrates the bus configuration of a prior art flat panel display system using a dual bus configuration to reduce EMI.
FIG. 3*c* illustrates the bus configuration of a flat panel display system in accordance with the present invention.

Because differential signaling doubles the number of data lines required to transmit pixel data, a straightforward implementation of differential signaling is undesirable because it requires additional PC board space to accommodate the additional data wires. The present invention solves this problem by doubling the data rates and multiplexing the data lines, thus bringing the number of data lines required to carry the differential signals back down to a number comparable to that of the prior art. The implementation of the reduced swing differential signaling scheme using a time-multiplexed data bus in accordance with the present invention is illustrated in FIG. 3*c*. FIGS. 3*a* to 3*c* provide a comparison of the number of data lines required to transmit video data in a conventional display system, a display system using a dual bus configuration, and a display system using the multiplexed RSDS scheme of the present invention. As will become apparent in the following discussion, the multiplexed RSDS scheme of the present invention achieves significant reduction in power dissipation and EMI without introducing substantial number of additional data wires.

Referring to FIG. 3*c*, a flat panel display system 300*c* using reduced swing differential signaling and a time-multiplexed data bus in accordance with the present invention requires only 20 wires to transmit the differential pixel data and the differential pixel clock. In FIG. 3*c*, timing controller 330*c* transmits differential pixel data on data bus 304*c* and a differential pixel clock signal on a clock line 302*c* to display drivers 320*ca* to 320*ce*. In the present embodiment of the present invention, two bits of pixel data are time multiplexed onto one pair of differential data lines. Thus, 9 pairs of differential data lines are required to transmit the 18-bit pixel data.

As described above, in display system 300*c*, a total of 20 wires are required to implement the differential signaling scheme: 18 data lines to transmit the multiplexed differential pixel data and 2 wires to transmit the differential pixel clock signal. The number of data wires required to implement the reduced swing differential signaling scheme of the present invention is not significantly increased from that of the conventional display system, such as system 300*a* in FIG. 3*a*. Moreover, the multiplexed RSDS scheme of the present invention represents a significant improvement over the current state of the art where the dual bus configuration in FIG. 3*b* is most commonly used to reduce EMI. The dual bus configuration requires 37 data wires to transmit pixel data whereas the multiplexed RSDS scheme of the present invention requires only 20 data wires. By multiplexing the data lines, the reduced swing differential signaling scheme can be implemented while preserving the economy of space on the PC board. In the present invention, the data rate is doubled by clocking the pixel data both at the rising edge and the falling edge of the pixel clock.

Figure 4A:
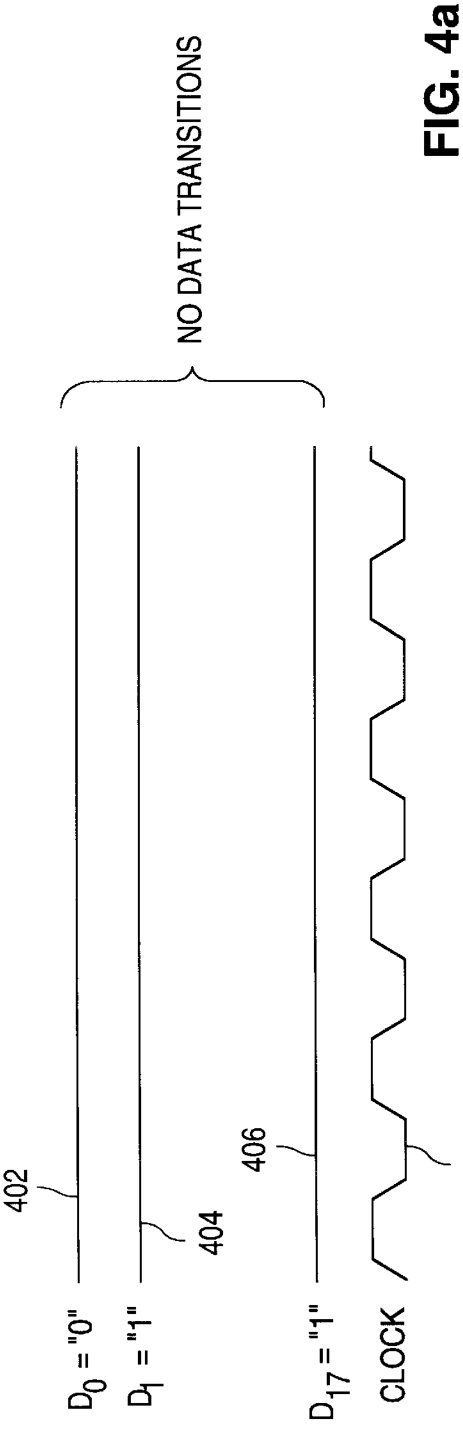
FIG. 4a (PRIOR ART)
FIG. 4*a* illustrates the pixel data waveforms in a prior art display system in the case where the same pixel color is being displayed over a number of pixels.
Figure 4B:
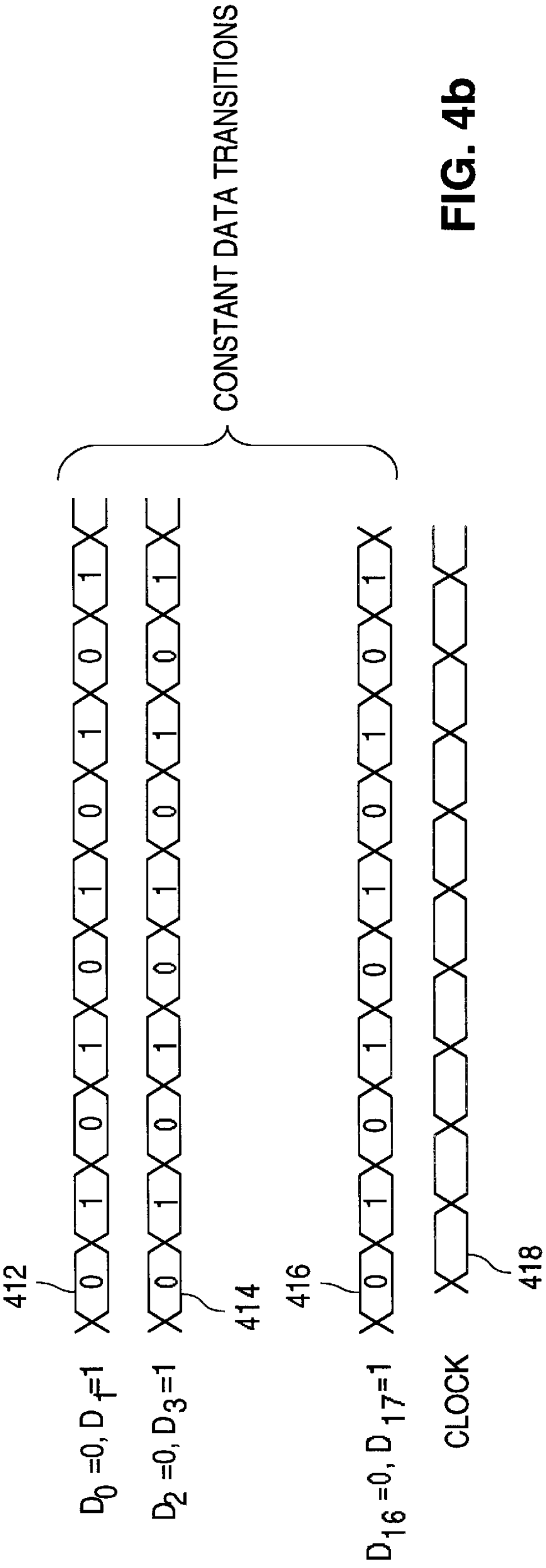
FIG. 4*b* illustrates the resultant pixel data waveforms by multiplexing the data lines in FIG. 4*a*.

Although multiplexing data lines can be advantageously used to reduce the number of data wires required to transmit differential signals, multiplexing video data can have undesirable side effects. One side effect is an increased number of data transitions occurring on the data lines. In video data, successive pixels are often the same color. Thus, in a prior art display system such as display system 300*a* in FIG. 3*a*, data on data bus 304*a* often remain constant for a number of pixels. FIG. 4*a* illustrates this result. In FIG. 4*a*, waveforms 402, 404 and 406 represent data bits D0, D1 and D17 of the pixel data, and waveform 408 represents the pixel clock. Each cycle of the pixel clock represents one pixel datum. Here, waveform 402 is shown as having a value of "0,", waveform 404 is shown as having a value of "1," and waveform 406 is shown as having a value of "1." When the same color is being displayed over several pixels, no data transition is observed on waveforms 402, 404 and 406 over the corresponding clock cycles. FIG. 4*b* illustrates the result of multiplexing the data lines in FIG. 4*a*. In FIG. 4*b*, waveform 412 multiplexes between bits D0 and D1, waveform 414 multiplexes between bits D2 and D3, and waveform 416 multiplexes between bits D16 and D17. Even though the same color is being displayed over several pixels such that the values of D0–D17 remain constant, waveforms 412, 414 and 416 are constantly changing because the waveforms multiplex between data bits having different values. For instance, in FIG. 4*b*, because Do has a value of "0" and D1 has a value of "1", waveform 412 is constantly changing between "0" and "1" even though D0 and D1 are not changing at all.

In the prior art system, when the pixel color repeats itself, the data lines are held constant and no power consumption or EMI generation results. However, as shown in FIG. 4*b*, when the data lines are multiplexed, there can be constant data transitions even though the same pixel color is being displayed. The constant data transitions cause an increase both in power consumption and in EMI generation. Therefore, a shortcoming of multiplexing video is that when the same pixel color is being displayed, multiplexing actually leads to more power consumption and more EMI than what would otherwise have been with non-multiplexing differential data lines.

The present invention provides several innovative data transmission schemes to overcome the side effects of multiplexing video data. The schemes address the constant data transitions problem associated with multiplexing video data. When a multiplexed reduced swing differential signaling scheme is used in combination with one or more of these data transmission schemes to transmit video data, data transitions on the data bus are reduced considerably, and significant reduction in power consumption and EMI generation can be achieved.

Two characteristics of video data transmission are pertinent to the data transmission schemes of the present invention. First, in a typical flat panel display system, a whole row of pixel data is stored at the receiving end (e.g. the display drivers) of the data bus. Second, pixel data have a tendency to repeat themselves both horizontally and vertically on a display. The data transmission schemes of the present invention take advantage of the stored pixel data and the repeatability of pixel data for displaying video data, rather than transmitting every pixel over the data bus.

Figure 5:
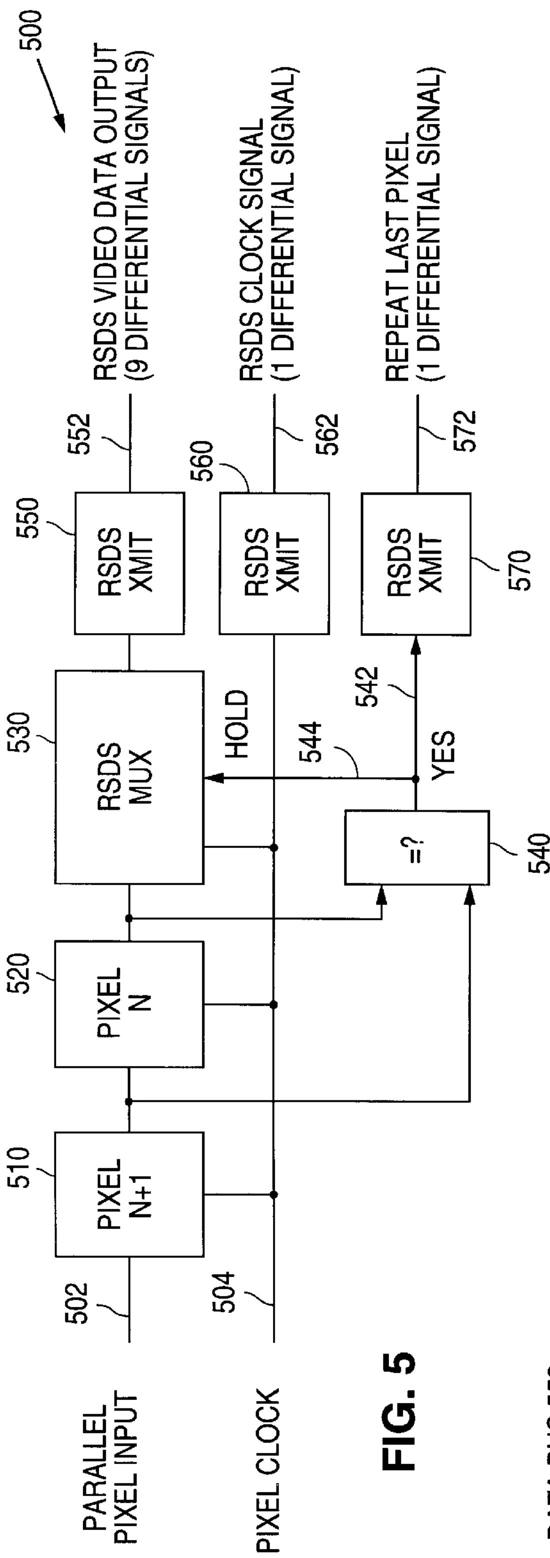
FIG. 5 is a block diagram illustrating the implementation of the Repeat Last Pixel scheme at the transmitting end of a data bus in a flat panel display system in accordance with the present invention.

In one embodiment of the present invention, the transmitting end transmits a "Repeat Last Pixel" (RLP) signal over the data bus whenever the current pixel data is the same as the previous pixel data. The Repeat Last Pixel scheme of the present invention takes advantage of the horizontal repeatability of video data where adjacent pixels on the same row tend to display the same color. FIG. 5 is a block diagram illustrating an implementation of the Repeat Last Pixel scheme at the transmitting end of the data bus, such as the timing controller. In FIG. 5, a host processor (not shown) provides pixel data to timing controller 500 on an input line 502. The input pixel data is stored in a next pixel register block 510. A pixel clock is provided to next pixel register block 510 on line 504. At each cycle of the pixel clock, pixel data stored in next pixel register block 510 is loaded into a current pixel register block 520 while new pixel data is being loaded into next pixel register block 510. The current pixel data in current pixel register block 520 are transmitted through a RSDS multiplexer 530 and a RSDS transmit block 550 onto data bus 552.

Under the RLP scheme, the content of next pixel register block 510 and current pixel register block 520 are compared in a comparator 540. If the next pixel data is different from the current pixel data, then timing controller 500 transmits the pixel data over data bus 552 as in normal operation. Referring to FIG. 5, where there is not a match, comparator 540 does not assert line 542 or line 544. At the next clock cycle, the next pixel data is loaded into current pixel register block 520 and transmitted to RSDS multiplexer 530. RSDS multiplexer 530 multiplexes the pixel data in current pixel register block 520 and provides the time-multiplexed pixel data to RSDS transmit block 550 for output onto data bus 552. Thus, the pixel data transmitted on data bus 552 are multiplexed reduced swing differential signals. The multiplexed pixel data is transmitted together with the pixel clock which is converted into a RSDS clock signal by RSDS transmit block 560.

On the other hand, if the next pixel data repeats the current pixel data, the RLP signal is used instead of transmitting the pixel data over data bus 552 again. Referring to FIG. 5, when comparator 540 detects a match, at the next clock cycle, comparator 540 asserts control line 542. RSDS Transmit block 570, upon receiving the asserted signal on control line 542, transmits a RLP signal on line 572. Meanwhile, control line 544 is also asserted placing RSDS multiplexer 530 in a "hold" state. In other words, RSDS multiplexer 530 holds its output constant, rather than transmitting pixel data in current pixel register block 520. Data bus 552 in turn is also held constant. Thus, when the current pixel data is the same as the last pixel data, only the RLP signal together with the differential pixel clock signal are transmitted to the display drivers. The RLP signal instructs to the respective display driver to use pixel data already in its storage, rather than expecting pixel data on data bus 552. The implementation of the Repeat Last Pixel scheme at the display drivers will be described in more detail below.

In this embodiment, the RLP signal is a reduced swing differential signal. However, this is illustrative only and is not intended to limit the invention to a reduced swing differential RLP signal. The RLP signal can be transmitted as a TTL level signal or any other means appropriate in a flat panel display system.

Under the Repeat Last Pixel scheme, the data bus is not used to transmit pixel data whenever the pixel data repeat themselves on the same line. The number of data transitions on the data bus is significantly reduced because the data bus is held constant whenever the same pixel is being transmitted. This leads to a significant reduction in power consumption and EMI generation.

In the above description, while the Repeat Last Pixel scheme is illustrated as being implemented in the timing controller as shown in FIG. 5, this arrangement is illustrative only and is not intended to limit the implementation of the Repeat Last Pixel scheme to the timing controller only. The Repeat Last Pixel scheme can be implemented in control circuitry at any point between and including the host processor and the display drivers. For the description that follows, the other innovative data transmission schemes of the present invention are also described with respect to an implementation at the timing controller. Similarly, this arrangement is illustrative only and is not intended to limit the invention to implementation at the timing controller only.

Figure 1:
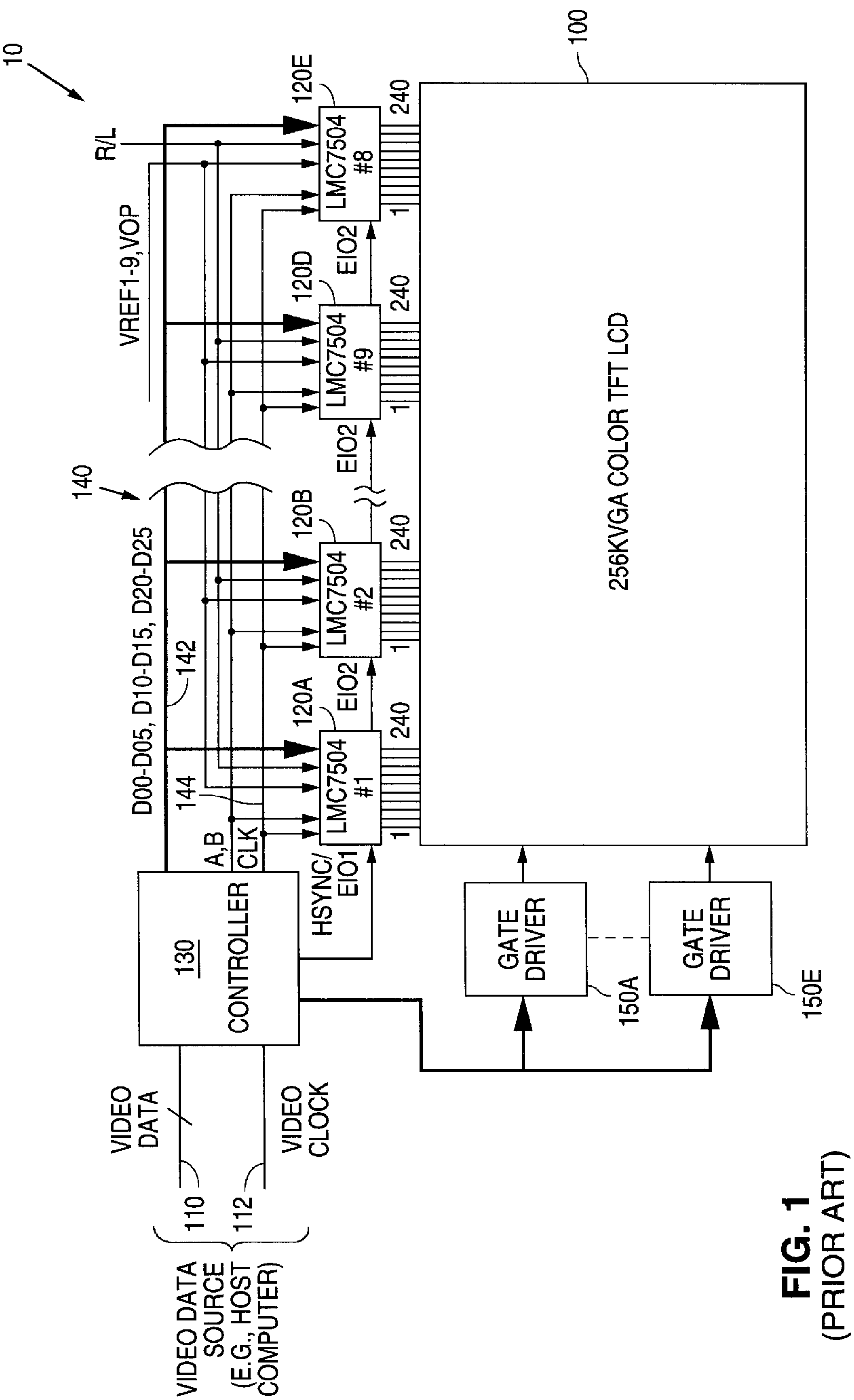
FIG. 1 (PRIOR ART)
FIG. 1 illustrates a block diagram of an exemplary flat panel display system using a single-bank display drivers configuration.
Figure 2:
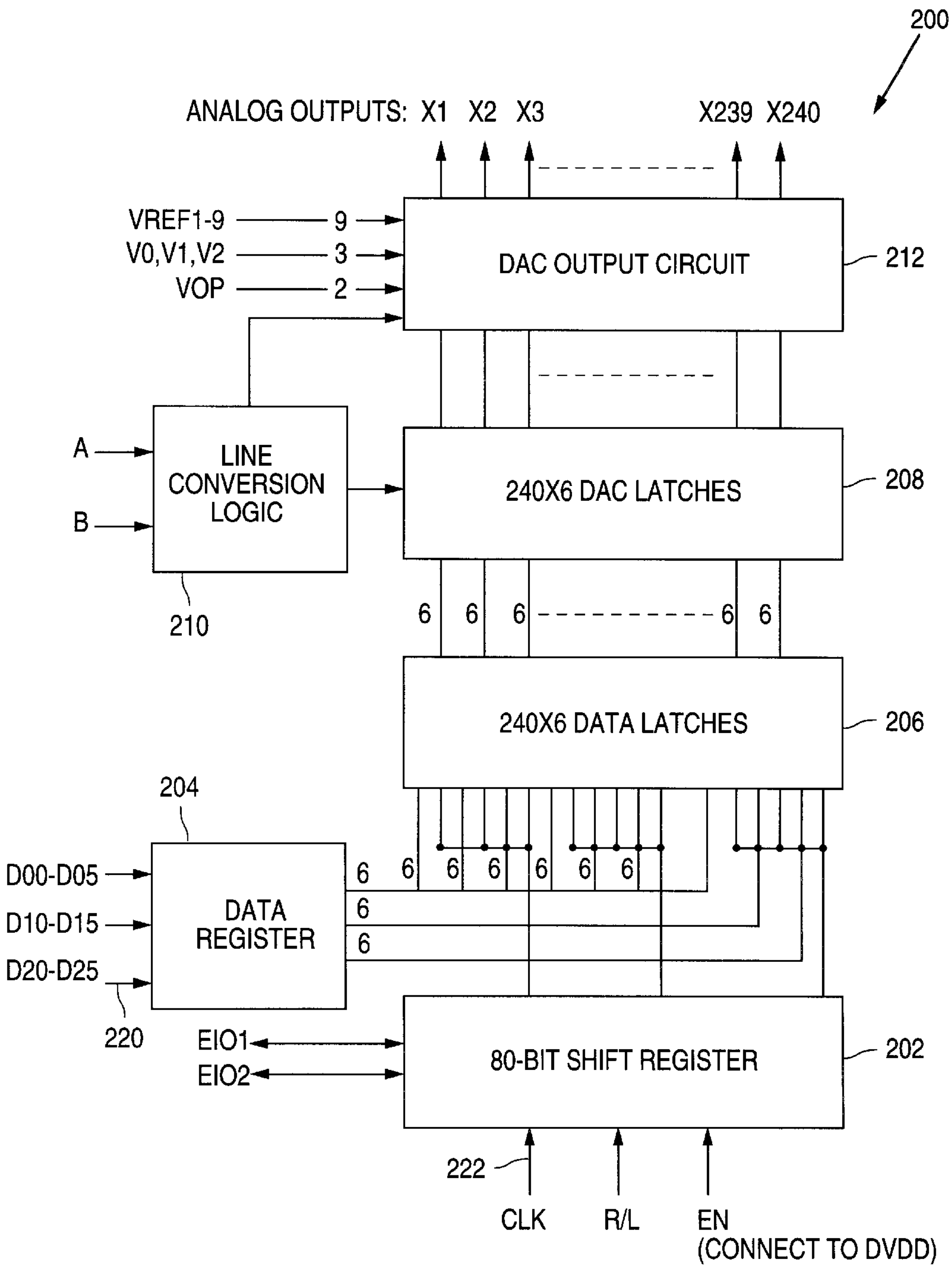
FIG. 2 (PRIOR ART)
FIG. 2 illustrates a block diagram of a representative display driver.
Figure 6:
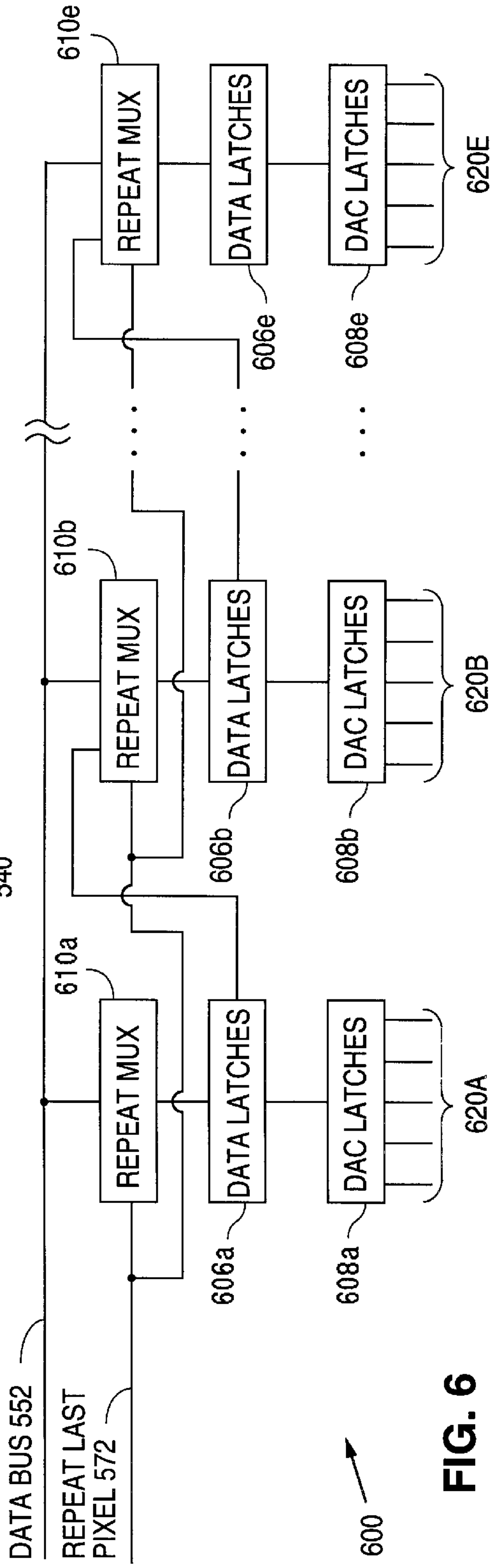
FIG. 6 is a block diagram illustrating one embodiment of the Repeat Last Pixel scheme at the receiving end of a data bus in a flat panel display system in accordance with the present invention.

Corresponding to the Repeat Last Pixel scheme implemented at the transmitting end, an implementation of the Repeat Last Pixel scheme at the receiving end of the data bus (e.g. the display driver) is illustrated in FIG. 6. Referring to FIG. 6, a display driver 600 includes data latches and DAC latches operating in the same manner as display driver 200 in FIG. 2. However, in FIG. 6, the data latches and DAC latches for each column of pixel data are depicted as separate elements in order to illustrate the operation of the Repeat Last Pixel scheme of the present invention. Thus, in FIG. 6, drivers 620A to 620E are components of display driver 600 and each controls one column of pixel data in the LCD display. Display driver 600 further includes repeat multiplexers 610*a* to 610*e* in each of drivers 620A to 620E. Repeat multiplexers 610*a* to 610*e* select as input either pixel data on data bus 552 or the previous pixel data stored in data latches 606*a* to 606*e* depending on the state of the Repeat Last Pixel signal on line 572. In the present embodiment, pixel data for the first driver in a display driver, that is driver 620A, will always be loaded from data bus 552. In a display system where multiple display drivers are used, pixel data for the first driver in each of the display drivers will be loaded directly from the data bus. However, in other embodiments, the display drivers can be configured using skill known in the art to extend the Repeat Last Pixel scheme across a bank of display drivers. For example, a register can be added to each display driver to store the last pixel data for the first column driver in a display driver.

During operation, if pixel data are being loaded into driver 620B, and the RLP signal on line 572 is not asserted, repeat multiplexer 610*b* selects data bus 552 and loads new pixel data on data bus 552 into data latches 606*b*. On the other hand, if the RLP signal is asserted, indicating that the current pixel (i.e., pixel data to be loaded into driver 620B) is the same as the last pixel, i.e., pixel data already loaded into driver 620A, repeat multiplexer 610*b* selects data latches 606*a* as input and loads the pixel data stored in data latches 606*a* into data latches 606*b*. The data bus is ignored in this operation and therefore can be held constant to reduce the number of data transitions.

The Repeat Last Pixel scheme exploits the horizontal repeatability of video data to reduce the amount of information required to be transmitted in conveying video data to a display. When applied in conjunction with a multiplexed reduced swing differential signaling scheme to transmit video data, significant reduction in power consumption and EMI is achieved because data transitions on the data bus are significantly reduced. Furthermore, because the Repeat Last Pixel scheme makes use of pixel data that are conventionally stored in the receiving device of a flat panel display system, no significant cost is introduced with its implementation.

While the Repeat Last Pixel signal scheme is provided to exploit the horizontal repeatability of video data, the present invention extends the concept further to include a Repeat Last Line Pixel scheme to exploit the vertical repeatability of video data. In another embodiment of the present invention, a timing controller sends a Repeat Last Line Pixel (RLLP) signal whenever the current pixel data is the same as the pixel data at the same column of the previous line. By transmitting only the RLLP signal, instead of the pixel data, significant reduction in the data transitions on a multiplexed data bus can be achieved. Furthermore, the RLLP scheme can be used in conjunction with the Repeat Last Pixel scheme described above to reduce the number of data transitions on the data bus whenever the current pixel data are horizontally or vertically repeated.

Figure 7:
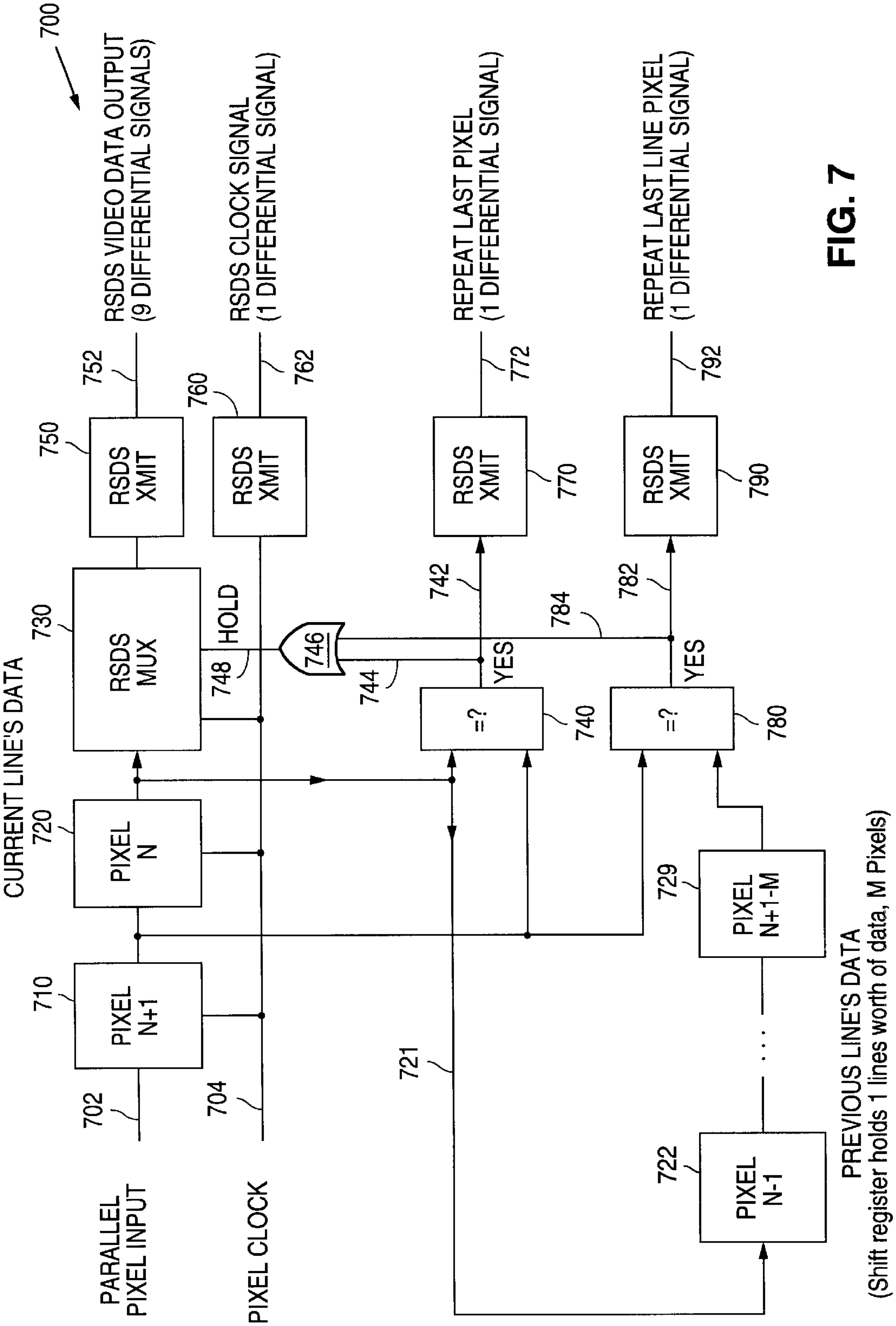
FIG. 7 is a block diagram illustrating the implementation of the Repeat Last Pixel scheme and the Repeat Last Line Pixel scheme at the transmitting end of a data bus in a flat panel display system in accordance with the present invention.

FIG. 7 illustrates an embodiment of the present invention implementing both the Repeat Last Pixel scheme and the Repeat Last Line Pixel scheme at the timing controller. Pixel data are provided to timing controller 700 on line 702 and stored in a next pixel register block 710. A pixel clock is provided on line 704 for clocking the register blocks of timing controller 700. Implementation of the Repeat Last Pixel scheme in FIG. 7 is the same as that in FIG. 5. Next pixel register block 710 holds the next pixel data while a current pixel register block 720 holds the current pixel data. The current pixel data and the next pixel data are compared in a comparator 740. If a match is found, at the next clock cycle, line 742 and 744 are asserted, causing RSDS transmit block 770 to transmit a RLP signal on line 772. Furthermore, asserted line 744, connected to the first input of an OR gate 746, causes OR gate 746 to assert its output signal on the hold line 748. In response, RSDS multiplexer 730 holds its output signals constant, ceasing transmission of pixel data on data bus 752.

In FIG. 7, timing controller 700 includes previous line register blocks 722 to 729 for storing the previous line of pixel data. In the present embodiment, one line of pixel data is defined as having M pixels. Previous line register blocks 722 to 729 comprise M shift registers, each shift register storing one pixel data such that register blocks 722 to 729 store one line of pixel data. Current pixel register block 720, besides providing the current pixel data to RSDS multiplexer 730 and to comparator 740, also loads the current pixel data into previous line register block 722 on line 721 for storage. As pixel data is being loaded into current pixel register block 720 in subsequent clock cycles, pixel data is shifted from register block 722 down to register block 729. When pixel data propagate down to register block 729, one line of pixel data has been transmitted. Thus, pixel data stored in register block 729 is the pixel data of the previous line but of the same column as the pixel data stored in next pixel register block 710.

To generate the RLLP signal, the pixel data from the current line (pixel data in next pixel register block 710) and pixel data from a previous line (pixel data in previous line register block 729) are compared at a comparator 780. If a match is found, then comparator 780 asserts lines 782 and 784, causing RSDS transmit block 790 to transmit a RLLP signal on differential signal line 792. Meanwhile, asserted line 784, connected to the second input terminal of OR gate 746, causes OR gate 746 to assert its output terminal, hold line 748. As a result, RSDS multiplexer 730 holds its output constant, ceasing transmission of pixel data on data bus 752.

If current pixel does not repeat horizontally or vertically, then hold line 748 would not be asserted and RSDS multiplexer 730 would operate to multiplex pixel data stored in current pixel register block 720 and pass the multiplexed pixel data to RSDS transmit block 750. RSDS transmit block 750 in turn transmits the multiplexed pixel data differentially over data bus 752.

Figure 8:
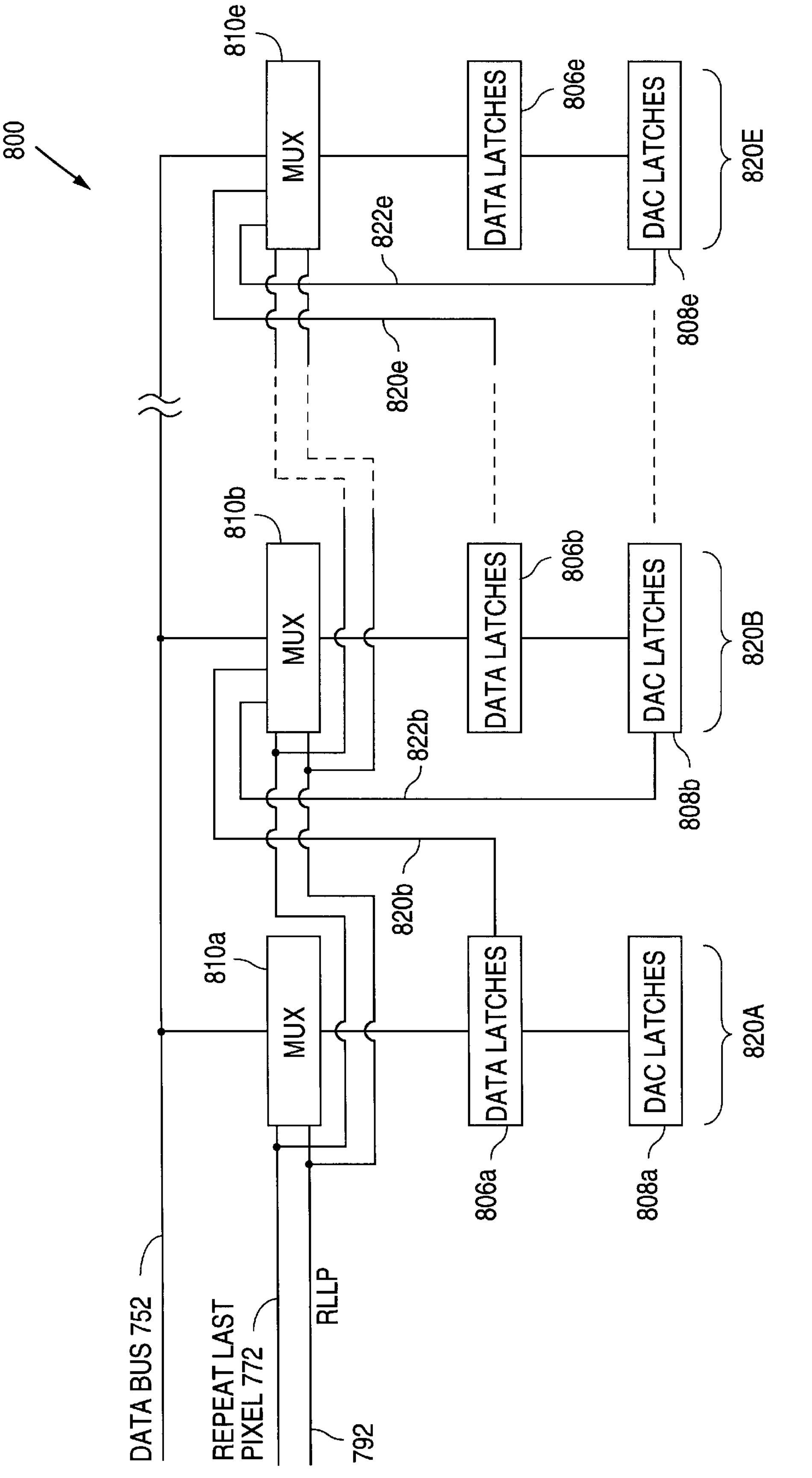
FIG. 8 is a block diagram illustrating the implementation of the Repeat Last Pixel scheme and the Repeat Last Line Pixel scheme at the receiving end of a data bus in a flat panel display system in accordance with the present invention.

FIG. 8 illustrates an embodiment of a display driver 800 implementing both the Repeat Last Pixel scheme and the Repeat Last Line Pixel scheme of the present invention. Display driver 800 includes drivers 820A to 820E, each driver controlling one column of pixel data. Repeat multiplexers 810*a* to 810*e* in each of drivers 820A to 820E receive as select signals RLP signal on line 772 and RLLP signal on line 792. Repeat multiplexers 810*a* to 810*e* also receive data input from data bus on line 752, previous pixel data on line 820*b* to 820*e*, and previous line pixel data on line 822*b* to 822*e*.

During operation, pixel data are loaded into driver 820B. If RLP signal is asserted indicating that the current pixel is the same as the previous pixel stored in data latches 806*a*, repeat multiplexer 810*b* selects line 820*b* as input and loads the previous pixel data into data latches 806*b*.

Further, if the RLLP signal is asserted indicating that the current pixel is the same as the corresponding pixel of the same column in the last row of pixels stored in DAC latches 808*b*, repeat multiplexer 810*b* selects line 822*b* as input and loads the previous line pixel data into data latches 806*b*.

Therefore, if either of signals RLP and RLLP is asserted, driver 820B ignores the data on data bus 752 which is being held constant to reduce power consumption and EMI. Repeat multiplexers 810*a* to 810*e* can be programmed accordingly to handle the situation where both the RLP signal and the RLLP signal are asserted. In that situation, repeat multiplexers 810*a* to 810*e* can use input either from the previous data latches or from the DAC latches of the same column. Of course, in the case when neither Repeat signals are asserted, repeat multiplexers 810*a* to 810*e* select pixel data input from data bus 752.

In FIGS. 7 and 8, the Repeat Last Pixel signal and Repeat Last Line Pixel signal are represented as reduced swing differential signals being transmitted over two separate pairs of data wires, line 772 and line 792. In another embodiment of the present invention, the two Repeat signals can be multiplexed onto a single pair of differential signal lines, thus minimizing the number of data lines required to implement both of the schemes and saving valuable PC board space. In yet another embodiment of the present invention, the two Repeat signals can be transmitted as conventional CMOS signals using TTL levels.

In another embodiment of the present invention, a Repeat Last Different Pixel (RLDP) scheme is employed to transmit video data comprising mainly monochrome information. The RLDP scheme exploits another aspect of video data transmission where pixel data change between only two or a few of the many possible colors. One example is the display of monochrome information where video data change between only two different colors.

In displaying monochrome video information, the RLDP scheme can be used in conjunction with the Repeat Last Pixel scheme described above such that only two signal lines are required to transmit all of the video data, instead of the 18 wires required to transmit the pixel data themselves. The data bus can be held constant for majority of the display time, significantly reducing power consumption and EMI generation. Furthermore, the RLDP signal and the RLP signal can be multiplexed onto the same pair of differential signal lines to save PC board space.

Under the RLDP scheme, local storage is provided at the transmitting end (e.g. the timing controller) and at the receiving end (the display drivers) for storing the "last different" pixel color. In the case where monochrome video information is being displayed, the "last different" pixel color would simply be the other pixel color not currently displayed. Whenever the current pixel color being displayed is different from the previous pixel color, the previous pixel color is stored in the local storage both at the transmitting end and the receiving end. For example, when the current pixel color is the first color and the previous display color is the second color, the second color is stored in local storage and the first color is transmitted to the display drivers. When the current pixel changes color such that the current pixel is now the second pixel color, a RLDP signal is sent instead of sending the pixel data. The display driver retrieves the second pixel color from its local storage for display. The "last different" pixel color—the first pixel color—is now stored in the local storage. The operation of the RLDP scheme is described further with reference to FIG. 9.

Figure 9:
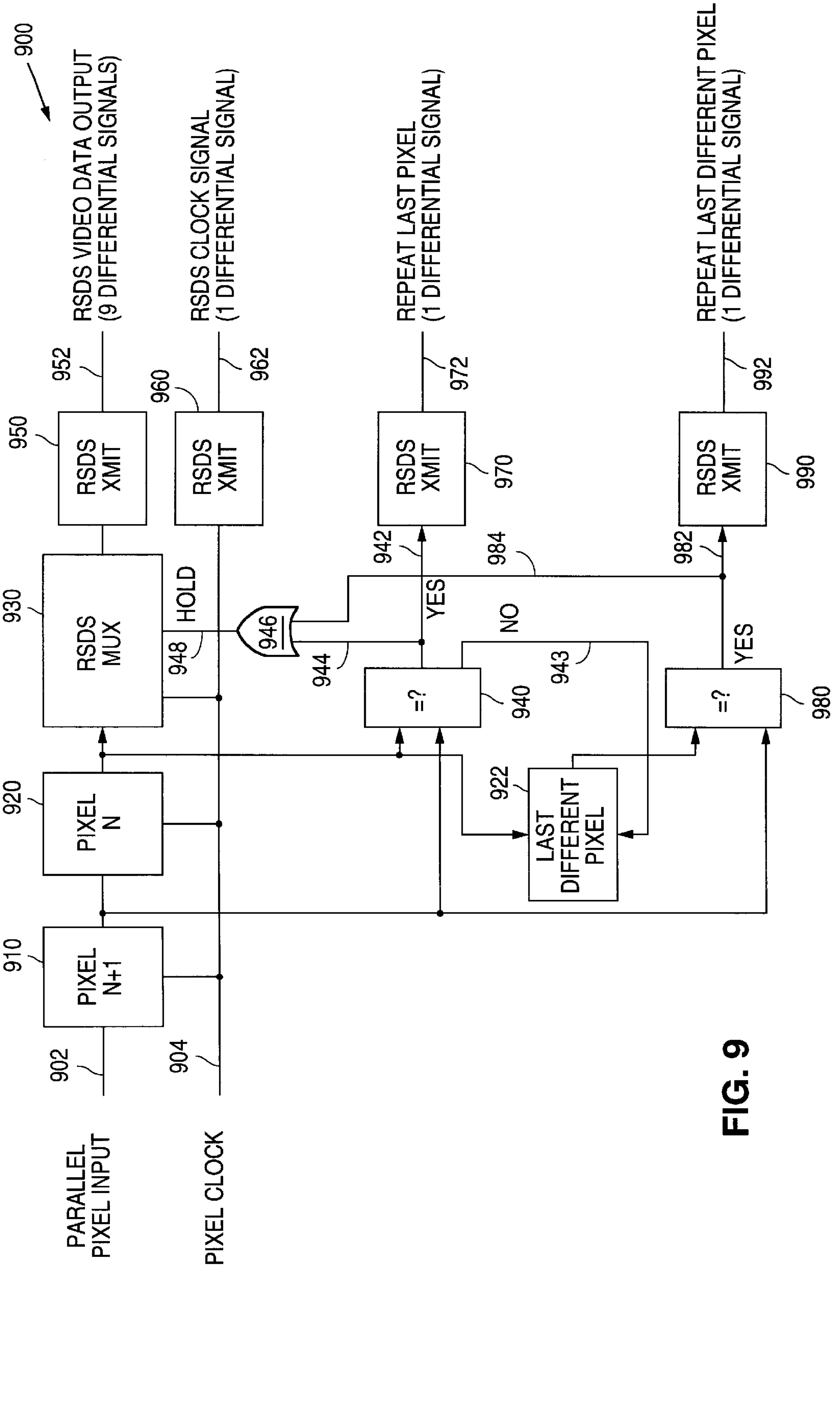
FIG. 9 is a block diagram illustrating the implementation of the Repeat Last Pixel scheme and the Repeat Last Different Pixel scheme at the transmitting end of a data bus in a flat panel display system in accordance with the present invention.

FIG. 9 illustrates one embodiment of the Repeat Last Different Pixel scheme used in conjunction with the Repeat Last Pixel scheme at the timing controller of a flat panel display system. In FIG. 9, implementation of the Repeat Last Pixel scheme is similar to that in FIG. 7. Like objects in FIG. 9 are numbered with like reference numerals and details of the RLP scheme are not further described. When the next pixel data loaded into next pixel register block 910 is the same as the current pixel data loaded in current pixel register block 920, at the next clock cycle, the RLP signal on line 972 is asserted and data bus 952 is held constant.

While the next pixel data is being compared with the current pixel data at comparator 940, the next pixel data is also being compared with the last different pixel data stored in last different pixel register block 922 at comparator 980. Last different pixel register block 922 stores the "last different" pixel color transmitted whenever there is a change in pixel color.

Because only two pixel colors are involved in displaying monochrome information, the next pixel data is either the same as the current pixel data stored in current pixel register block 920 or the same as the last different pixel stored in last different pixel register block 922. When the next pixel data is the same as the current pixel data, indicating that the same color is being displayed, the RLP signal is asserted at the next clock cycle as previously described. When the pixel color changes, the next pixel data will then be the same as the last different pixel data. In this case, comparator 980 asserts line 982 causing RSDS transmit block 990 to transmit the RLDP signal to the display drivers. Comparator 980 also asserts line 984 connected to the second input terminal of an OR gate 946. When line 984 is asserted, hold line 948 which is the output terminal of OR gate 946 is also asserted, causing RSDS multiplexer 930 to hold data bus 952 constant, ceasing transmission of pixel data in current pixel register block 920. The first input terminal of OR gate 946 is connected to line 944 which connects to the output terminal of comparator 940.

After noting a change in the pixel color, the content of last different pixel register block 922 needs to be updated with the last different color. In FIG. 9, when comparison of pixel data in next pixel register block 910 and current pixel register block 920 yields a "non-match" at comparator 940, line 943 is asserted. "Non-match" line 943 is coupled to the write enable terminal of last different pixel register block 922. When line 943 asserts the write enable of last different pixel register block 922, pixel data stored in current pixel register block 920 is written into last different pixel register block 922. Thus, the "last different" pixel color is stored. Similar operation is also performed to update the local storage in the display drivers to store the corresponding "last different" pixel color. For proper operation, last different pixel register block 922 in timing controller 900 and the local storage of the display drivers should be initialized to the same value at system start-up. With respect to the display drivers, pixel data for the first driver in a display driver will always be loaded from the data bus. In a display system where multiple display drivers are used, pixel data for the first driver in each of the display drivers will need to be loaded directly from the data bus. However, in another embodiment, the display drivers can be configured using skill known in the art to extend the Repeat Last Different Pixel scheme across a bank of display drivers.

With the use of the Repeat Last Pixel scheme and the Repeat Last Different Pixel scheme, the display of monochrome video information can be achieved by transmitting only the two Repeats signals. Once the two pixel colors have been transmitted over the data bus and stored in the local storage of the display drivers, subsequent pixel data need not be transmitted any more and the data bus can be held constant. Instead, the RLP and RLDP signals are used exclusively to determine which one of the two colors is to be displayed. Therefore, the RLP scheme and the RLDP scheme can be effectively used to eliminate almost all the data transitions on the data bus during transmission of monochrome video data. Significant reduction in power consumption and EMI is achieved.

In the above description, while the RLDP scheme in FIG. 9 is illustrated as being implemented for the display of monochrome video data, this is illustrative only and is not intended to limit the application of the RLDP scheme to monochrome video data only. The RLDP scheme can be applied whenever two or a few pixel colors predominate in a flat panel display.

According to another embodiment of the present invention, the Repeat Last Different Pixel scheme is expanded to store not only one, but several different colors. A dynamic color pallet is included both in the transmitting end and the receiving end of the data bus for storing a number of most frequently used pixel colors. The dynamic color pallet can be implemented as a cache memory. Current pixel data are compared with the contents of the color pallet. If the pixel color of the current pixel is present in the pallet, then the color's cache memory address, rather than the pixel data itself, is sent to the display drivers over the data bus. The respective display driver, upon receiving the memory address, retrieves the corresponding pixel color from its own cache memory. A "least recently used" or other appropriate replacement algorithm can be used to determine when a pixel color is to be replaced in the dynamic color pallet.

When a dynamic color pallet scheme is employed, the data bus transmits only the memory address information rather than the pixel data. This results in a significant reduction in the number of data transitions occurring on the data bus. For example, when a dynamic color pallet storing 16 colors is used, only 4 bits are needed to transmit the cache memory address as opposed to the 24 bits required to transmit the pixel data itself. The reduction in the number of data transitions results in lower power consumption and EMI generation.

The data transmission schemes of the present invention are described above with reference to a multiplexed data bus transmitting video data using reduced swing differential signaling to reduce the number of data transitions on the data bus. However, this is illustration only and is not intended to limit the invention for use with a RSDS multiplexed data bus. The data transmission schemes of the present invention can be used in conjunction with any kind of video data format for transmitting video data to achieve reduced power consumption and EMI.

The above detailed descriptions are provided to illustrate the specific embodiments of the present invention and are not intended to be limiting. Numerous modifications and variations within the scope of the present invention are possible. The present invention is defined by the appended claims thereto.

I claim:

1. A control circuitry for a video display system, said video display system comprising a display having a plurality of columns and a plurality of lines of pixels, and a plurality of gate drivers for activating sequentially one of said plurality of lines of pixels on said display, said control circuitry comprising:

a transmitting circuit for transmitting video data over a data bus, said transmitting circuit comprising a comparator for comparing video data for a first pixel with video data for a second pixel;

a receiving circuit for receiving said video data on said data bus and driving voltages representing said video data onto said plurality of columns of pixels on said display; and a data line coupling said transmitting circuit and said receiving circuit;

wherein said transmitting circuit transmits a repeat signal over said data line and ceases transmission of said video data over said data bus when video data of said first and second pixels are the same.

2. The control circuitry of claim 1, wherein said data bus has a first number of data wires, said video data comprise a plurality of databits which are reduced swing differential signals and said plurality of databits are time-multiplexed on said data bus so that said first number of data wires is less than the number of said plurality of databits.

3. The control circuitry of claim 1, wherein said repeat signal is a reduced swing differential signal.

4. The control circuitry of claim 1, wherein said second pixel follows said first pixel on the same line of pixels.

5. The control circuitry of claim 4, wherein said receiving circuit comprises a multiplexer coupled to said data bus and said data line, said multiplexer selecting previously stored video data for said first pixel to transmit onto a column of said display associated with said video data for said second pixel when said receiving circuit receives said repeat signal on said data line.

6. The control circuitry of claim 4, wherein said transmitting circuit is a timing controller, said timing controller comprises:

a current pixel register for storing video data of said first pixel;

a next pixel register for storing video data of said second pixel, an output of said next pixel register being connected to an input of said current pixel register; and a multiplexer for selectively transmitting video data stored in said current pixel register onto said data bus, a select input of said multiplexer being connected to an output of said comparator.

7. The control circuitry of claim 4, wherein said receiving circuit comprises a first and a second display driver, each of said display drivers storing video data for one pixel, each of said display drivers comprises:

a first data latch for storing video data of a current line;

a second data latch for storing video data of a previous line, an input of said second data latch being connected to an output of said first data latch; and a multiplexer having a select input connected to said repeat signal, a first input connected to said data bus, and an output connected to an input of said first data latch;

wherein said output of said first data latch of said first display driver is coupled to a second input of said multiplexer of said second display driver.

8. The control circuitry of claim 1, wherein said first pixel is in a first line of pixels and said second pixel is in a second line of pixels, said second line following said first line, and said first and second pixels are in the same column within said respective first and second lines.

9. The control circuitry of claim 8, wherein said receiving circuit comprises a multiplexer coupled to said data bus and said data line, said multiplexer selecting previously stored video data of said first pixel to transmit onto a respective column of said display associated with said video data of said second pixel when said receiving circuit receives said repeat signal on said data line.

10. The control circuitry of claim 8, wherein said transmitting circuit is a timing controller, said timing controller comprises:

a current pixel register for storing video data of said second pixel in said second line of pixels;

a previous line pixel register for storing video data for said first pixel in said first line of pixels; and a multiplexer for selectively transmitting video data stored in said current pixel register onto said data bus, a select input of said multiplexer being connected to an output of said comparator.

11. The control circuitry of claim 8, wherein said receiving circuit comprises at least one display driver for storing video data for one pixel, and said display driver comprises:

a first data latch for storing video data of said second line;

a second data latch for storing video data of said first line, an input of said second data latch being connected to an output of said first data latch; and a multiplexer having a select input connected to said repeat signal, a first input connected to said data bus, a second input connected an output of said second data latch, and an output connected to an input of said first data latch.

12. The control circuitry of claim 1, wherein said first pixel is the last different pixel stored in a last different pixel register.

13. The control circuitry of claim 12, wherein said receiving circuit comprises a multiplexer coupled to said data bus and said data line, said multiplexer selecting previously stored video data of said first pixel to transmit onto a respective column of said display associated with said video data of said second pixel when said receiving circuit receives said repeat signal.

14. The control circuitry of claim 12, wherein said transmitting circuit is a timing controller, said timing controller comprises:

a current pixel register for storing video data of a third pixel, an output of said current pixel register being connected to an input of said last different pixel register;

a next pixel register for storing video data of said second pixel, an output of said next pixel register being connected to an input of said current pixel register;

a second comparator for comparing video data in said current pixel register and video data in said next pixel register, an output of said second comparator being connected to a write enable input of said last different pixel register; and a multiplexer for selectively transmitting video data stored in said current pixel register onto said data bus, a select input of said multiplexer being connected to an output of said comparator.

15. The control circuitry of claim 1, wherein said first pixel is one of two or more pixel colors stored in a pixel color storage in said transmitting circuit, and said repeat signal is a pixel color address associated with said first pixel in said pixel color storage.

16. The control circuitry of claim 15, wherein said receiving circuit retrieves video data for said first pixel from a pixel color storage of said receiving circuit using said pixel color address to transmit onto a respective column of said display associated with said video data of said second pixel.

17. The control circuitry of claim 15, wherein said pixel colors stored in said pixel color storage of said transmitting circuit and said receiving circuit are updated using a least recently used algorithm.

18. The control circuitry of claim 1, wherein said data bus has a first number of data wires, said video data comprise a plurality of databits which are reduced swing differential signals and said plurality of databits are time-multiplexed on said data bus so that said first number of data wires is less than the number of said plurality of databits.

19. A method for conveying video data in a video display system, said method comprising:

transmitting video data for a first pixel over a data bus;

comparing video data of a second pixel with video data of said first pixel;

transmitting a repeat signal over a data line and ceasing transmission of said video data over said data bus when said video data of said second pixel are the same as said video data of said first pixel; and transmitting said video data of said second pixel over said data bus when said video data of said second pixel are different from said video data of said first pixel.

20. The method of claim 19, wherein said data bus has a first number of data wires, said video data comprise a plurality of databits which are reduced swing differential signals and said plurality of databits are time-multiplexed on said data bus so that said first number of data wires is less than the number of said plurality of databits.

21. The method of claim 19, wherein said repeat signal is a reduced swing differential signal.

22. The method of claim 19, wherein said second pixel immediately follows said first pixel.

23. The method of claim 22, further comprising:

driving voltages onto a display corresponding to said video data of said first pixel after receipt of said video data for said first pixel;

retrieving from a local storage video data for said second pixel upon receipt of said repeat signal; and driving voltages onto said display for said second pixel using video data retrieved from said local storage.

24. The method of claim 19, wherein said first pixel is in a first line of pixels and said second pixel is in a second line of pixels, said second line following said first line, and said first and second pixels are in the same column within said respective first and second lines.

25. The method of claim 24, further comprising:

driving voltages onto a display corresponding to said video data of said first pixel after receipt of said video data for said first pixel;

retrieving from a local storage video data for said second pixel upon receipt of said repeat signal; and driving voltages onto said display for said second pixel using video data retrieved from said local storage.

26. The method of claim 19, wherein said first pixel is the last different pixel stored in a last different pixel register.

27. The method of claim 26, further comprising:

driving voltages onto a display corresponding to said video data of said first pixel after receipt of said video data for said first pixel;

retrieving from a local storage video data for said second pixel upon receipt of said repeat signal; and driving voltages onto said display for said second pixel using video data retrieved from said local storage.

28. The method of claim 19, wherein said first pixel is one of two or more pixel colors stored in a pixel color storage in said transmitting circuit, and said repeat signal is a pixel color address associated with said first pixel in said pixel color storage.

29. The method of claim 28, further comprising:

retrieving from a local storage video data for said second pixel upon receipt of said pixel color address; and driving voltages onto said display for said second pixel using video data retrieved from said local storage.

30. The method of claim 19, wherein said data bus has a first number of data wires, said video data comprise a plurality of databits which are reduced swing differential signals and said plurality of databits are time-multiplexed on said data bus so that said first number of data wires is less than the number of said plurality of databits.

* * * * *